March 14, 1961 D. G. FAWCETT ET AL 2,975,298
MAGNETIC CORE SWITCHING CIRCUIT
Filed Sept. 12, 1958 2 Sheets-Sheet 1
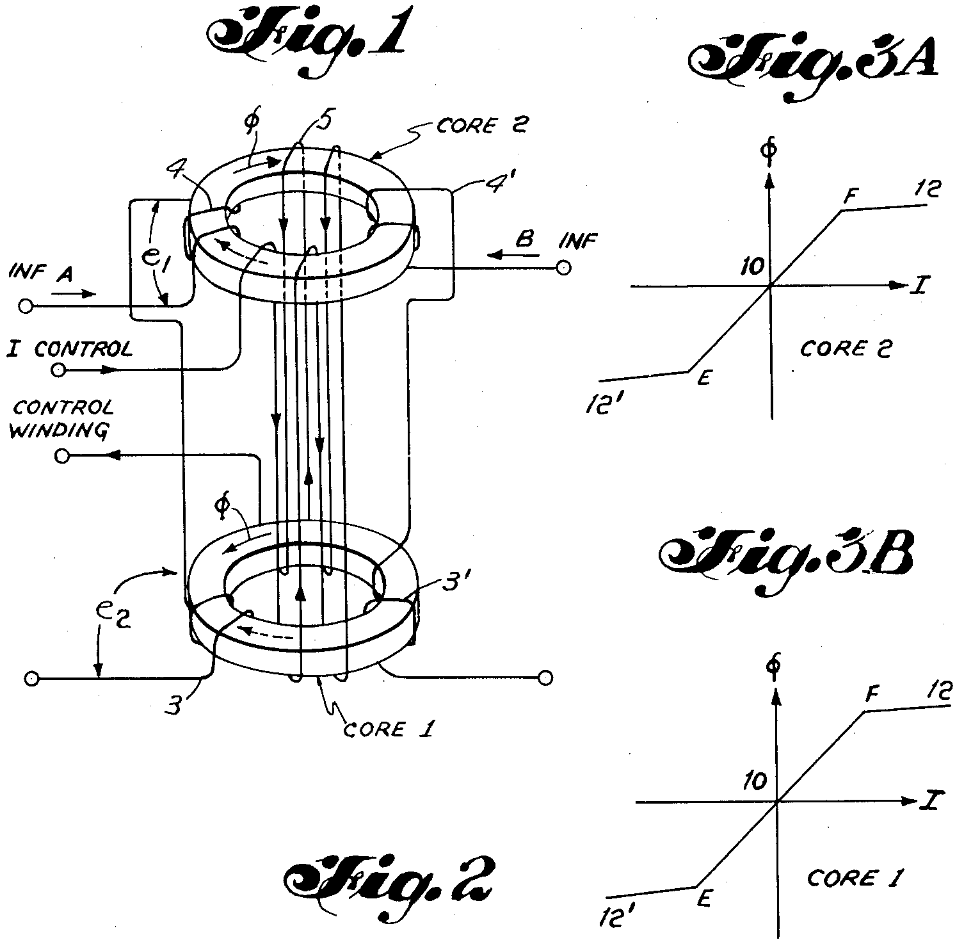
Fig. 1, Fig. 3A, Fig. 3B, Fig. 2
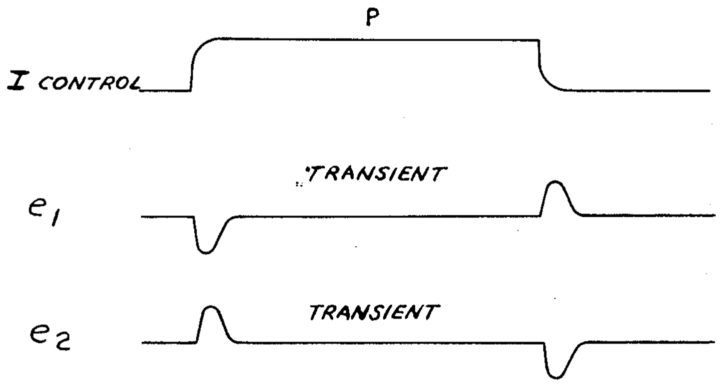
Inventors
DANIEL G. FAWCETT
PAUL J. CARPENTER
By Charles Baraff
Agent

MAGNETIC CORE SWITCHING CIRCUIT

Filed Sept. 12, 1958 2 Sheets-Sheet 2

Inventors
DANIEL G. FAWCETT
PAUL J. CARPENTER
By Charles Baraff
Agent

United States Patent Office 2,975,298

Patented Mar. 14, 1961

2,975,298

MAGNETIC CORE SWITCHING CIRCUIT

Daniel G. Fawcett, Upper Montclair, and Paul J. Carpenter, Fair Lawn, N.J., assignors to International Telephone and Telegraph Corporation, Nutley, N.J., a corporation of Maryland Filed Sept. 12, 1958, Ser. No. 760,594

5 Claims. (Cl. 307—88)

This invention relates to magnetic core switching circuits and more particularly to such circuits utilizing ferrite cores.

Electronic switching has found a widening field of application in recent years, particularly for certain operations in telephone and telegraph exchanges and in applications to electronic digital computers. Concomitantly, it has been known that ferrite cores may be used as switching elements or storage elements in telecommunications and in computers.

However, in the association of ferrite core switching with magnetic drum storage, certain problems have arisen in connection with the reading and writing operations of the magnetic drum. With a desire for increased computation speeds in electronic data processing systems and the like has come a need for a fast, reliable method of switching tracks on a magnetic memory drum.

It is an object of this invention to provide an improved magnetic core switching element particularly one which is bidirectional in the flow of information.

Another object is the provision of an element as decribed above which is adapted to pass high-level rectangular pulses in one direction, for example, for transmission of information for recording on a magnetic drum and low level sinusoidal pulses in the opposite direction with equal facility during readout.

Another object of the invention is to minimize both electromagnetic and electrostatic interaction between the information circuits and the saturation control circuits of a ferrite core saturable transformer switching circuit.

Another object of the invention is to nullify the effects of transients arising from the pulsing of the saturation control circuits and prevent them from affecting the information signal bits in a magnetic core switching circuit.

A feature of the invention is a magnetic switch comprising two ferrite cores in juxtaposition, wherein the information windings of each core are diametrically opposite each other and the control saturation windings are wound intermediate and around both cores to achieve better coupling control, to minimize interwinding capacity, facilitate magnetic core saturation and prevent interaction between the control and information currents.

In an article entitled the "Transfluxor" by J. A. Rajchman and A. W. Lo in Proceedings of the IRE, volume 44, No. 3, March 1956, pages 321–332, a computer system is shown for switching information to various tracks on a magnetic storage drum including a matrix arrangement of magnetic cores and transistor drivers.

The present invention is concerned with a saturable transformer, magnetic core switching circuit which is advantageously used in an electronic computer of the type disclosed in the aforementioned IRE publication. In accordance with the invention, the core switching circuit is characterized by two ferrite ring cores in juxtaposition, each core having information windings diametrically opposite each other and a common saturation control winding wound about both cores in the space between the information windings. The various windings are so arranged relatively to each other as to nullify the effects of transient currents due to the control signal changes and thereby to minimize interaction between the information and control windings, also to reduce interwinding capacity and maximize the frequency response both of the ferrite core switch and the memory matrix built up therefrom.

Referring to the figures of the drawing:

Fig. 1 shows a bidirectional magnetic core switch in accordance with the invention;

Fig. 2 is an explanatory graph of waveforms associated with the core switch of Fig. 1;

Figs. 3A and 3B are characteristic operating curves for magnetic cores 1 and 2 of Fig. 1;

Figure 6A:
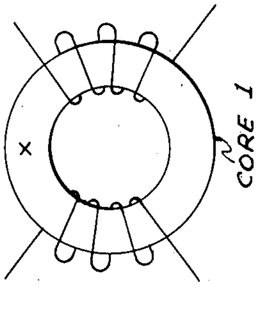
Figs. 6A and 6B are perspective views of the individual ferrite cores shown in Fig. 5 and their windings.

Referring to Fig. 1, the magnetic switch comprises two ferrite cores 1, 2, which are assembled in juxtaposition to form a single switching element, with two sets of information windings 3, 3' and 4, 4' wound physically opposite one another on ring core 1 and ring core 2 in a similar manner. A common saturation control winding 5 is wound about both cores in the space between the single information windings (3, 3' and 4, 4') aforementioned.

The information windings are shown diametrically opposite each other in Fig. 1, and in the intervening space is located the saturation control winding 5. This arrangement of windings wherein both information and control windings are physically spaced far apart, minimizes interwinding capacity and thereby maximizes the frequency response of the ferrite core switch and a memory matrix built up from such cores.

The reason for the juxtaposition of the single ferrite cores 1 and 2, is to effect a cancellation of the transients induced in the information windings every time that the saturation control winding 5 is pulsed for a track selection by a rectangular pulse P of the form illustrated in Fig. 2. These transients arise from the rise and fall times of the rectangular control pulse P, and induce equal voltages $e\mathbf{1}$ and $e\mathbf{2}$ in the information windings 3, 4 but of opposite polarity as indicated in Fig. 2. Thereby any possible effects of the transients on the information currents is nullified by the bucking out of the induced currents as will be shown below. In this manner, no interference with the information signals can arise from the presence of transients due to the control winding pulsing by the quasi-D.C. pulses of rectangular shape P and relatively long duration as compared to the information bits.

As shown in Fig. 1, the information windings 3 and 4 are conductively connected together, and likewise windings 3' and 4'. The dotted arrows in cores 1 and 2 represent the transient currents as being in the same direction. But due to the opposition turns of the windings 3 and 4, the induced voltages $e\mathbf{1}$ and $e\mathbf{2}$ are necessarily of opposite polarity (see Fig. 2).

Idealized characteristic magnetization curves are shown in Figs. 3A and 3B respectively for ferrite cores 1 and 2. When no saturation control current flows thru the control winding, due to the absence of the rectangular control pulse P, the opening point is at 10, representing zero current and zero flux. This is the region of high permeability and therefore the magnetic switch acts as a transformer, and the information signals or bits are readily passed bilaterally from one information winding to the other as indicated by the arrows A and B (Fig. 1).

When the rectangular control pulse P is active, current flows thru the control winding 5 and the operating point of the $\phi$ (flux) versus I (current) characteristic is shifted to position 12 in the saturation region of the ferrite core. This is the area of very low permeability and the transformer acts like a short circuit over this region and blocks information signal from passing thru the magnetic core switch.

Figure 4:
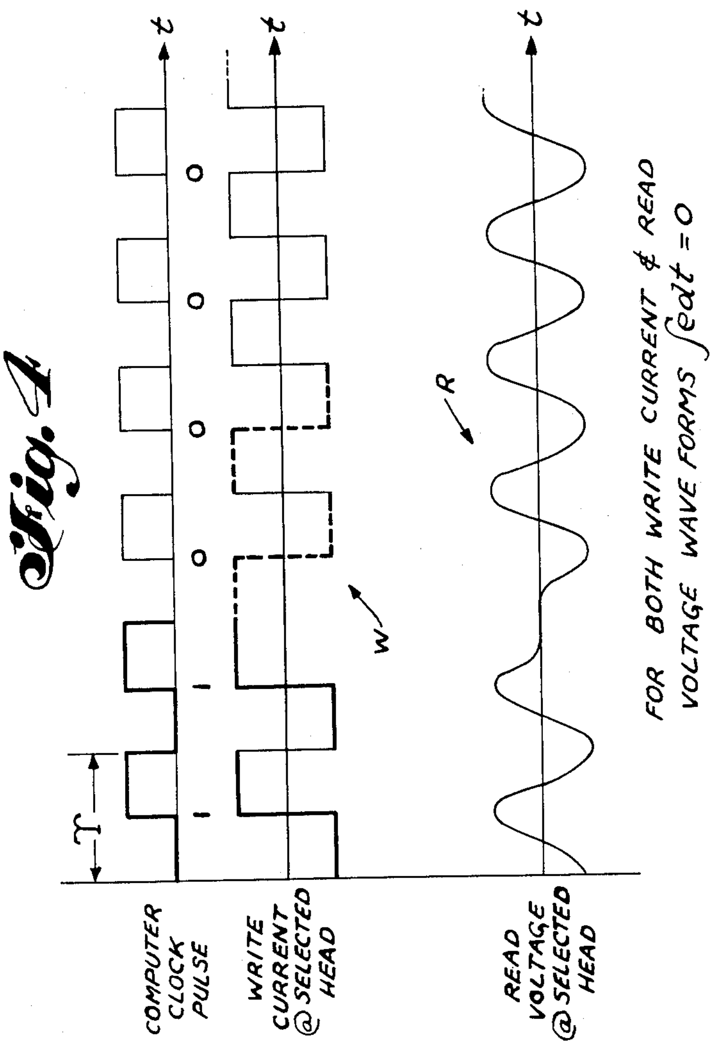
Fig. 4 shows the waveforms of read and write pulses representing the information signals.

The information signals or bits which are applied to the information windings, have the waveforms shown in Fig. 4. The write pulses *w* are square-topped information pulses of relatively short time duration as compared to the saturation control pulses P of Fig. 2, while the read pulses R are of sinusoidal form. The amplitudes of the sinusoids are considerably smaller than the write pulse amplitudes. However, the core switch passes both types of information pulses bilaterally with equal facility.

The writing pulses *w* shown as square-topped waves in Fig. 4, have characteristically a zero D.C. component and are applied to the saturable core transformer switch as information signals. In the recording technique, phase modulation is used to represent "binary bits" (0 and 1) and to accommodate read and write pulse waveforms with a zero D.C. component.

Fig. 4 also shows a typical current waveform *w* for writing at the selected magnetic drum head (not shown). The "1" bit (_|‾) is shown as a solid line and is low the first half period, and high the second half period. The "0" bit (‾|_) conversely is represented by the dotted line and is high the first half period, and low the second half period.

The reading waveform R, Fig. 4, has a sinusoidal waveshape with a zero D.C. component, since it originates from the magnetic drum.

The reason for using a recording technique such as the phase modulation method of Fig. 4 whose waveshapes contain no D.C. component, is to cause minimum shift of the operating point on the linear portion E–F of the magnetizing curve (Figs. 3A, 3B) of the saturable core switch. A D.C. component in the information waveshapes would tend to move the operating point into the saturation region 12 of the magnetization characteristic curve, resulting in non-linearity and producing distortion of the output waveform.

An alternative system of recording termed "Return to Zero" may be utilized in connection with the magnetic core switching circuit described. Such a system which utilizes unsymmetrical binary coded information patterns, does contain a small D.C. component in its waveforms. This D.C. component can be accommodated in the present switching circuit provided the duration of recording be kept short relative to the time constant of the magnetic core switch. In such an "RZ" system, a reset pulse would have to be introduced into the saturation control winding to bring the ferrite core back to the proper operating point on the magnetization curve i.e. into the linear region EF (Fig. 4).

Figure 6B:
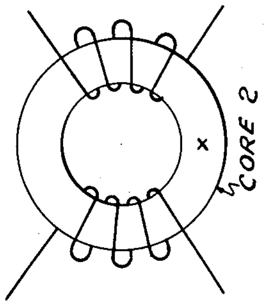
Figure 5:
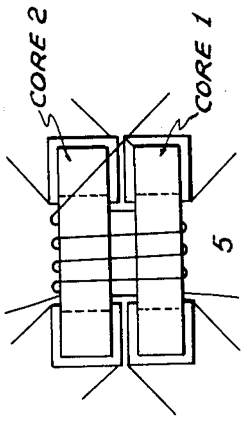
Fig. 5 is a perspective view of a ferrite core switch assembly.

The unitary assembly of the juxtaposed ferrite cores 1, 2 and the windings thereon are shown in Fig. 5, while the individual ferrite cores 1, 2 with their information windings per se are illustrated in Figs. 6A and 6B.

In the assembly of the cores and windings, the information windings are wound on the cores 1 and 2 in a similar manner, Figs. 6A and 6B. Then core 2 is turned upside down, placed on core 1, and the common control winding 5 is then wound about both cores, juxtaposed so that the *x* positions of the cores are aligned.

It should be understood that other appliactions may be made of the magnetic core switching elements of the invention, for example, in telemetric transmission of information from a plurality of sources along a common channel and the like.

It is to be understood that the above-described arrangements are merely illustrative of the principles of the invention. It should be appreciated by those skilled in the art that equivalent arrangements may be devised without departing from the spirit and scope of the invention.

We claim:

1. A bilateral saturable transformer switch comprising two magnetic cores, a first pair of information windings, a second pair of information windings, one winding of said first and said second pairs being mounted on one of said cores and the other winding of said first and said second pairs being mounted on the other of said cores with the windings of said first pair being adjacent each other on their respective cores and the windings of said second pair being opposite the windings of said first pair, means connecting the windings of said first pair in series in electrical opposition so that their flux is opposed, means connecting the windings of said second pair in series in electrical opposition so that their flux is opposed, and a saturation control winding over both cores in the space between the information windings so that the induced currents are opposed in the windings of said first pair, and also in the windings of said second pair.

2. A bilateral saturable transformer switch comprising two magnetic cores, a first pair of information windings, a second pair of information windings, one winding of said first and said second pairs being mounted on one of said cores and the other winding of said first and said second pairs being mounted on the other of said cores with the windings of said first pair being adjacent each other on their respective cores and the windings of said second pair being opposite the windings of said first pair in the windings of said first pair being oppositely wound with respect to each other, the windings of said second pair being oppositely wound with respect to each other, means connecting the windings of said first pair in series, means connecting the windings of said second pair in series, and a saturation control winding over both cores in the space between the information windings to thereby induce opposed currents in the windings of said first pair and also in the windings of said second pair.

3. A bilateral saturable transformer according to claim 1 wherein the two magnetic cores overlie each other and are in physical juxtaposition.

4. A bilateral saturable transformer according to claim 1 wherein the saturation control winding has each turn thereof looping around both cores.

5. A bilateral switching circuit comprising the saturable transformer of claim 1, means connected to said information windings to pass pulses representing binary information bits bidirectionally through said transformer and means for applying switching pulses to said saturation winding to control said switching circuit.

References Cited in the file of this patent

UNITED STATES PATENTS

| | | |
|---|---|---|
| 2,467,807 | Camilli et al. | Apr. 19, 1949 |
| 2,666,178 | Kramer | Jan. 12, 1954 |